US008503795B2

(12) United States Patent
Wakebe

(10) Patent No.: US 8,503,795 B2
(45) Date of Patent: Aug. 6, 2013

(54) STORE SYSTEM, READING APPARATUS, AND SALES REGISTRATION APPARATUS

(75) Inventor: Satoshi Wakebe, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/220,884

(22) Filed: Aug. 30, 2011

(65) Prior Publication Data

US 2012/0051586 A1     Mar. 1, 2012

(30) Foreign Application Priority Data

Sep. 1, 2010   (JP) .................. 2010-196204

(51) Int. Cl.
*G06K 9/68*      (2006.01)
(52) U.S. Cl.
USPC .......................................... 382/218; 705/414
(58) Field of Classification Search
None
See application file for complete search history.

(56) References Cited

U.S. PATENT DOCUMENTS

| 6,363,366 B1 * | 3/2002 | Henty ........................... 705/400 |
| 2007/0057049 A9 * | 3/2007 | Kundu et al. ................. 235/383 |

FOREIGN PATENT DOCUMENTS

| JP | 08-221577 | 8/1996 |
| JP | 08-227480 | 9/1996 |
| JP | 08227480 A * | 9/1996 |
| JP | 2003-187335 | 7/2003 |
| JP | 2004-206357 | 7/2004 |
| JP | 2008-033640 | 2/2008 |

OTHER PUBLICATIONS

Japanese Office Action for Japanese Application No. 2010-196204 mailed on Oct. 16, 2012.
English Translation of Office Action of Decision of Rejection for Japanese Patent Application No. 2010-196204 Dated Apr. 30, 2013, 6 pgs.

* cited by examiner

*Primary Examiner* — Bhavesh Mehta
*Assistant Examiner* — Siamak Harandi
(74) *Attorney, Agent, or Firm* — Turocy & Watson, LLP

(57) ABSTRACT

A store system includes a reading unit that includes an image acquiring unit and an image output unit, and a sales registration apparatus that includes a similar image detection unit and a sales registration unit. The image acquiring unit acquires an image that is captured by an image capturing unit. The image output unit outputs the acquired image. The similar image detection unit detects an image of a product that is similar to at least a portion of the output image by referencing product management information in which information relating to sales registration of a product and an image of the product are associated for each product. The sales registration unit registers sales of a product based on information relating to the sales registration associated with the image of the detected product.

6 Claims, 6 Drawing Sheets

| PRODUCT ID | PRODUCT CATEGORY | PRODUCT NAME | UNIT PRICE | PRODUCT IMAGE | |
|---|---|---|---|---|---|
| ⋮ | ⋮ | ⋮ | ⋮ | ⋮ | |
| 11111111 | TEA | TEA FROM XX | ¥1000 | TEA | ~D1 |
| 22222222 | TEA | TEA FROM OO | ¥1500 | TEA | ~D2 |
| ⋮ | ⋮ | ⋮ | ⋮ | ⋮ | |

STORE SYSTEM, READING APPARATUS, AND SALES REGISTRATION APPARATUS

CROSS-REFERENCE TO RELATED APPLICATION

This application is based upon and claims the benefit of priority from Japanese patent application number 2010-196204, filed on Sep. 1, 2010, the entire contents of which are incorporated herein by reference.

FIELD

Embodiments described herein relate generally to a store system, a reading apparatus, and a sales registration apparatus.

BACKGROUND

Conventionally, in stores such as supermarkets, a product code reading apparatus that image captures a code symbol such as a barcode or a two-dimensional code (for example, a QR code (registered trademark)) that is attached to a product by a digital camera such as a CCD image sensor and which reads a product code by detecting and decoding a code symbol from the captured image is used. A store clerk registers a product that a customer purchases by taking out a product that is kept in a shopping basket that the customer brings over to a counter and holding the product over the digital camera of the product code reading apparatus.

However, with the product registration of the related art described above, since a code symbol that is attached on the product is image captured, there is need for the store clerk to identify a location where the code symbol is attached when handling the product and to turn the code symbol toward the digital camera. In particular, since the location where the code symbol is attached is different for each product, there are cases when the store clerk takes time in identifying the location where the code symbol is attached.

DETAILED DESCRIPTION

In order to solve the problems described above, an embodiment is a store system that includes a reading apparatus that includes an image acquiring unit and an image output unit, and a sales registration apparatus that includes a similar image detection unit and a sales registration unit. The image acquiring unit acquires an image that is captured by an image capturing unit. The image output unit outputs the acquired image. The similar image detection unit detects an image of a product that is similar to at least a portion of the output image by referencing product management information in which information relating to sales registration of a product and an image of the product are associated for each product. The sales registration unit registers sales of a product based on information relating to the sales registration associated with the image of the detected product.

In addition, another embodiment is a reading apparatus that includes an image acquiring unit, a product detection unit, and an image output unit. The image acquiring unit acquires an image that is captured by an image capturing unit. The product detection unit detects a product that is included in the acquired image. The image output unit outputs the acquired image when a product is detected.

Furthermore, still another embodiment is a sales registration apparatus that includes a similar image detection unit and a sales registration unit. The similar image detection unit detects an image of a product that is similar to at least a portion of a captured image of a product for which sales is to be registered by referencing product management information in which information relating to sales registration of a product and an image of the product are associated for each product. The sales registration unit registers sales of a product based on information relating to the sales registration associated with the image of the detected product.

The store system, the reading apparatus, and the sales registration apparatus according to the embodiments will be described below with reference to the drawings, with a checkout system as an example. The checkout system has a configuration that includes a POS terminal as the sales registration apparatus that performs registration and clearing of a product for a single transaction, and a code reading apparatus that reads a product code and the like that is attached to the product, and is one example of the store system. The embodiment is an application example of a checkout system that is installed in stores such as restaurants and supermarkets.

Figure 1:
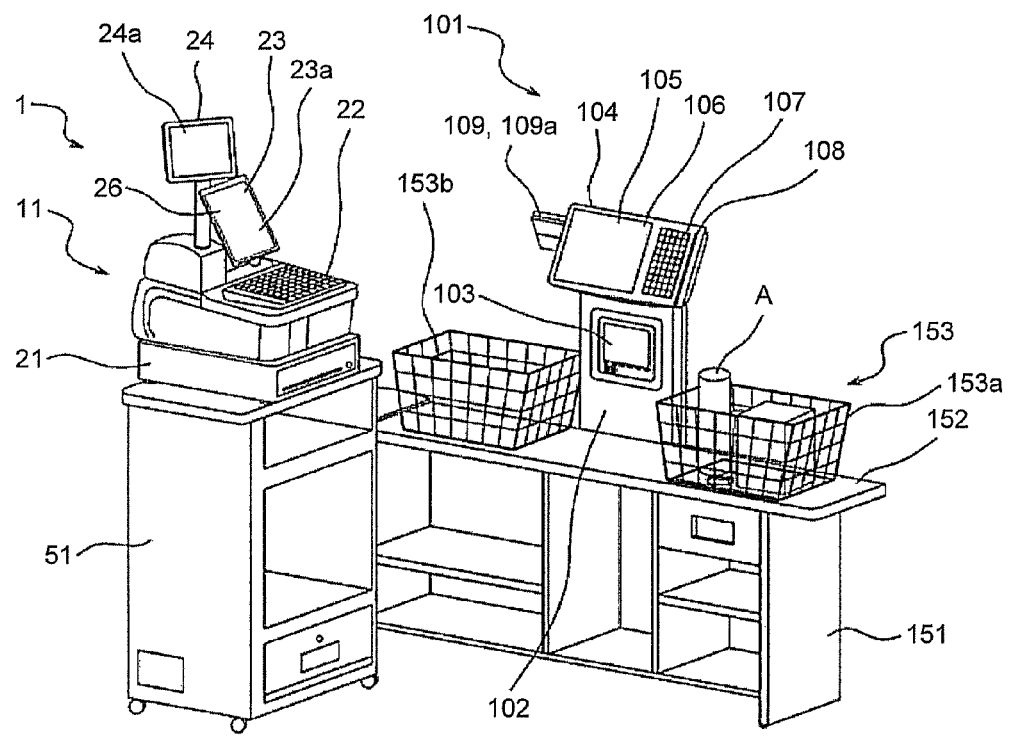
FIG. 1 illustrates a perspective diagram of a checkout system.

FIG. 1 illustrates a perspective diagram of a checkout system 1. As illustrated in FIG. 1, the checkout system 1 includes a POS terminal 11 that performs registration and clearing of a product for a single transaction. The POS terminal 11 is placed on an upper surface of a drawer 21 over a checkout stand 51. The drawer 21 receives control of a releasing action by the POS terminal 11. A keyboard 22 that is operated by being pressed down by an operator (store clerk) is arranged on an upper surface of the POS terminal 11. A display device 23 that displays information to the operator is provided further back from the keyboard 22 as seen by the operator that operates the keyboard 22. The display device 23 displays information on a display surface 23a thereof. A touch panel 26 is laminated on the display surface 23a. A customer display device 24 is provided upright to be rotatable further back from the display device 23. The customer display device 24 displays information on a display surface 24a thereof. Here, although the customer display device 24 illustrated in FIG. 1 has the display surface 24a facing the front side of FIG. 1, by rotating the customer display device 24 so that the display surface 24a faces the back side of FIG. 1, the customer display device 24 displays information facing a customer.

An oblong counter stand 151 is arranged so as to form an L shape with the checkout stand 51 on which the POS terminal 11 is placed. A load-bearing surface 152 is formed on an upper surface of the counter stand 151. A shopping basket 153 that holds products A is placed on the load-bearing surface 152. The shopping basket 153 can be thought of separately as a first shopping basket 153a that is brought by the customer and a second shopping basket 153b that is positioned at a position that interposes a product reading apparatus 101 with the first shopping basket 153a.

The product reading apparatus 101 that is connected to the POS terminal 11 to be able to freely transmit and receive data is installed on the load-bearing surface 152 of the counter stand 151. The product reading apparatus 101 includes a flat rectangular housing 102. A reading window 103 is arranged on a front surface of the housing 102. A displaying and operating unit 104 is affixed to an upper portion of the housing 102. A display device 106 on a front surface of which a touch panel 105 is laminated is provided on the displaying and operating unit 104. A keyboard 107 is arranged next to the display device 106 on the right. A card reading slit 108 of a card reader (not shown) is provided next to the keyboard 107 to the right. A customer display device 109 that is a display device provided to face the customer for displaying information to the customer is installed to the back left side of a back surface of the displaying and operating unit 104 as seen by the operator. A customer touch panel 109a is laminated on a display surface of the customer display device 109.

The first shopping basket 153a that is brought by the customer contains the products A for one transaction. The products A are moved to the second shopping basket 153b by a hand of the operator. The products A are pointed to the reading window 103 of the product reading apparatus 101 by such a movement process. At this time, an image capturing unit 164 (refer to FIG. 2) that is arranged to the back side of the reading window 103 image captures the products A. In the product reading apparatus 101, when it is detected that images captured by the image capturing unit 164 include the products A, the captured images are output to the POS terminal 11. In the POS terminal 11, images of the products A that are similar to at least a portion of regions of the output images are detected by referencing a PLU file F1 (details will be described later) in which information relating to sales registration of the products A and the images of the products A are associated for each of the products A. Next, in the POS terminal 11, sales of the products A are registered based on information relating to the sales registrations related to the detected images of the products A.

Figure 2:
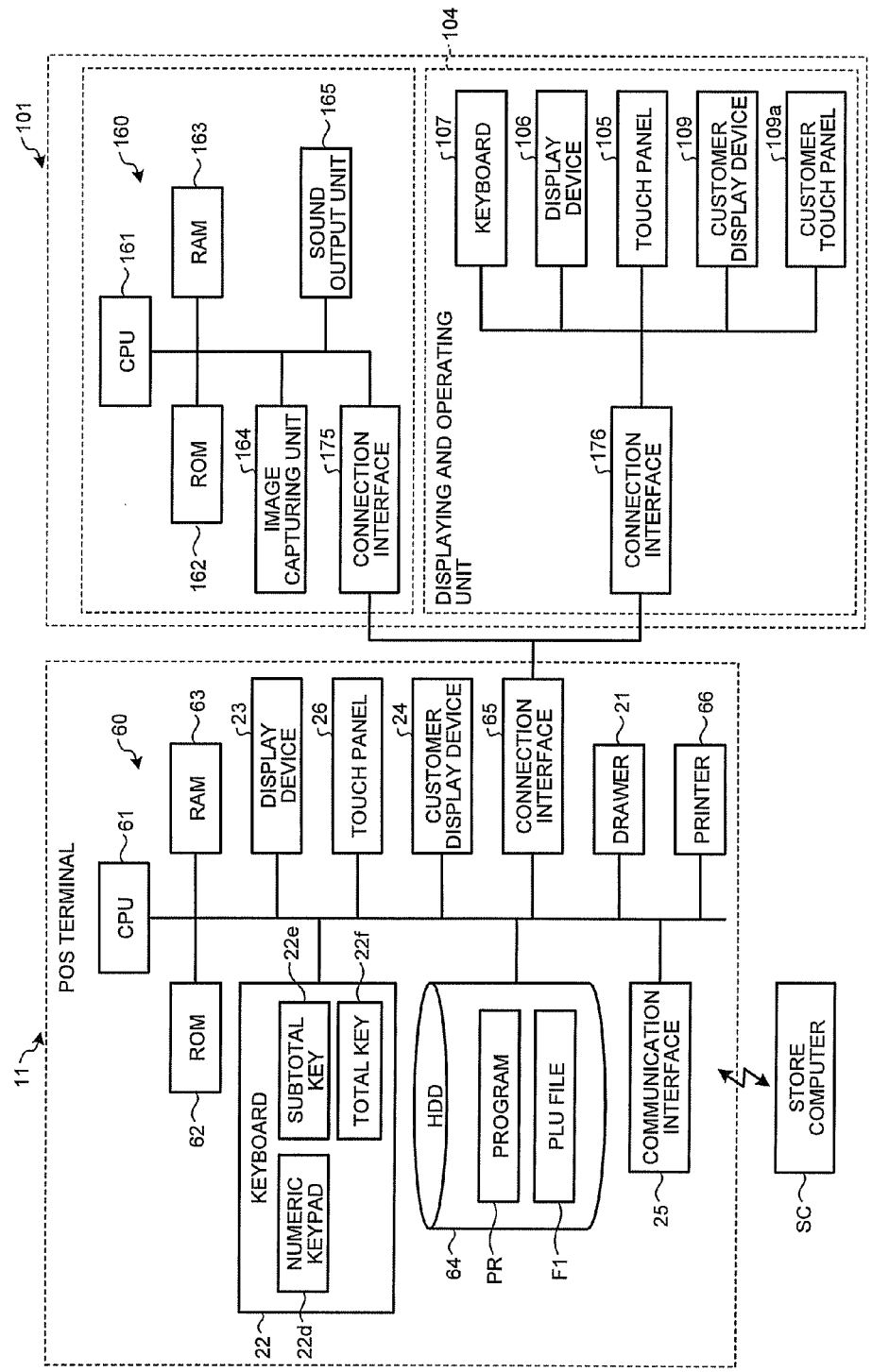
FIG. 2 illustrates a block diagram of a hardware configuration of a POS terminal and a product reading apparatus.

FIG. 2 illustrates a block diagram of a hardware configuration of the POS terminal 11 and the product reading apparatus 101. The POS terminal 11 is provided with a microcomputer 60 as an information processing unit that executes information processing. The microcomputer 60 is configured by a ROM 62 (Read Only Memory) and a RAM 63 (Random Access Memory) connected by a bus to a CPU 61 (Central Processing Unit) that executes various types of calculation processes and controls each unit.

The drawer 21, the keyboard 22, the display device 23, the touch panel 26, and the customer display device 24 described above are all connected via various types of input and output circuits (none of which are shown) in the CPU 61 of the POS terminal 11. Such parts receive control from the CPU 61.

The keyboard 22 includes a numeric keypad 22d in which numbers such as "1", "2", "3" . . . and an operator for multiplying that is "×" are displayed on an upper surface, a subtotal key 22e, and a total key 22f. The keyboard 22 outputs operation inputs of the operator by the numeric keypad 22d, the subtotal key 22e, and the total key 22f to the CPU 61. The keyboard 22 is an operating unit configured to receive an operation from the operator.

An HDD 64 (Hard Disk Drive) 64 is connected to the CPU 61 of the POS terminal 11. Programs and various types of files are stored on the HDD 64. The programs and various types of files that are stored on the HDD 64 have the entirety or a portion thereof copied to the RAM 63 when the POS terminal 11 is started and are sequentially executed by the CPU 61. A program PR for product marketing data processing is one example of the program that is stored on the HDD 64. The PLU file F1 that is transmitted from a store computer SC and stored in advance is one example of the file that is stored on the HDD 64.

Figure 3:
FIG. 3 is a conceptual diagram which exemplifies a data configuration of a PLU file.

The PLU file F1 is a file in which information relating to the sales of the products A and images of the Products A are associated for each of the products A displayed and marketed in stores. FIG. 3 is a conceptual diagram that exemplifies a data configuration of the PLU file F1. As illustrated in FIG. 3, the PLU file F1 stores information relating to a product such as a product category to which each of products A belongs, a product name, and a unit price, and a product image in which the product is image captured for each product ID that is assigned uniquely to the products A. When the product A that is to have a sales registration performed is read by the product reading apparatus 101, the POS terminal 11 specifies the product A that is to have the sales registration performed by referencing the PLU file F1 and detecting a similar product image, and performs the sales registration by recording information relating to the sales registration such as the product ID, the product category, the product name, and the unit price of the specified product A on a sales master file (not shown).

Returning to FIG. 2, a communication interface 25 for executing data communication with the store computer SC is connected to the CPU 61 of the POS terminal 11 via input and output circuits (not shown). The store computer SC is installed in a backyard or the like of a store. The PLU file F1 that is transmitted to the POS terminal 11 is stored in an HDD (not shown) of the store computer SC.

A connection interface 65 that makes data transceiving with the product reading apparatus 101 possible is connected to the CPU 61 of the POS terminal 11. Therefore, the connection interface 65 is connected to the product reading apparatus 101. Further, a printer 66 that performs printing on a receipt or the like is connected to the CPU 61 of the POS terminal 11. The POS terminal 11 prints a transaction content (cleared amount or points awarded) or like of one transaction on the receipt under the control of the CPU 61.

The product reading apparatus 101 also includes a microcomputer 160. The microcomputer 160 is configured by a ROM 162 and a RAM 163 being connected by a bus to a CPU 161. A program that is executed by the CPU 161 is stored in the ROM 162. The image capturing unit 164 and a sound output unit 165 are connected to the CPU 161 via various types of input and output circuits (none of which are shown). Actions of the image capturing unit 164 and the sound output unit 165 are controlled by the CPU 161. The displaying and operating unit 104 is connected to the POS terminal 11 via a connection interface 176. Actions of the displaying and operating unit 104 are controlled by the CPU 61 of the POS terminal 11.

The image capturing unit 164 is a CCD image sensor, a CMOS image sensor, or the like, and performs image capturing from the reading window 103 under the control of the CPU 161. For example, in the image capturing unit 164, image capturing of a moving image of 30 fps is performed. Frame images that are sequentially image captured by a predetermined frame rate by the image capturing unit 164 are saved in the RAM 163. The sound output unit 165 is a sound circuit, a speaker, or the like that generates a warning sound or the like that is set in advance. The sound output unit 165 alerts of sounds such as a warning sound under the control of the CPU 161.

Furthermore, a connection interface 175 that is connected to the connection interface 65 of the POS terminal 11 and that makes data transceiving with the POS terminal 11 possible is connected to the CPU 161. Under the control of the CPU 161, an image that is image captured by the image capturing unit 164 of the product reading apparatus 101 is output via the connection interface 175 and input to the POS terminal 11 via the connection interface 65.

Figure 4:
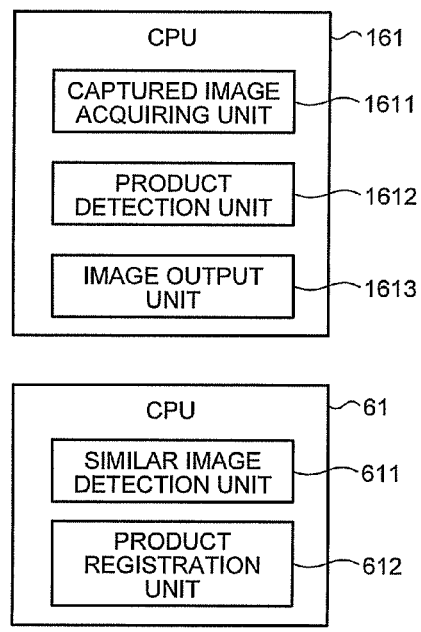
FIG. 4 illustrates a block diagram of a functional configuration of a CPU.

Next, functional units of the CPU 161 and the CPU 61 that are realized by the CPU 161 and the CPU 61 sequentially executing programs will be described with reference to FIG. 4. FIG. 4 illustrates a block diagram of the functional configurations of the CPU 161 and the CPU 61. As illustrated in FIG. 4, the CPU 161 includes functions as a captured image acquiring unit 1611, a product detection unit 1612, and an image output unit 1613 by sequentially executing programs. Similarly, the CPU 61 includes functions as a similar image detection unit 611 and a product registration unit 612.

The captured image acquiring unit 1611 causes the image capturing unit 164 to start an image capturing action by outputting an image capturing ON signal to the image capturing unit 164. The captured image acquiring unit 1611 sequentially acquires frame images that the image capturing unit 164 image captures after starting the image capturing action and which are saved in the RAM 163. The acquisition of the frame images by the captured image acquiring unit 1611 is performed in the order that the frame images are saved in the RAM 163.

The product detection unit 1612 detects products that are included in the frame images, which are acquired by the captured image acquiring unit 1611, using a pattern matching technique or the like. Specifically, outlines or the like are extracted from images in which the acquired frame images are binarized. Next, outlines extracted from the nearest frame images and an outline extracted from the present frame image are compared, and portions where there are changes, that is, appearances of products that are directed to the reading window 103 for sales registration, are detected. Here, as a different method of detecting a product, the presence or absence of skin-colored regions are detected from the acquired frame images. Next, when skin-colored regions are detected, that is, when an appearance of a hand of a store clerk is detected, extraction of an outline of a product that is supposed to be held in the hand of the store clerk is attempted by performing detection of the outlines described above. At this time, when an outline that shows the shape of a hand and an outline other than such an outline are detected, the appearance of the product is detected from the fact that the hand of the store clerk is holding the product.

The image output unit 1613 outputs the frame images acquired by the captured image acquiring unit 1611 to the POS terminal 11 via the connection interface 175. Although the image output unit 1613 may successively output the frame images acquired by the captured image acquiring unit 1611 to the POS terminal 11, in the embodiment, frame images in which the product is detected by the product detection unit 1612 are output to the POS terminal 11. In such a manner, by outputting frame images in which the product is detected by the product detection unit 1612 to the POS terminal 11, detection of a similar image in which the FLU file F1 is referenced by frame images that do not include a product is able to be prevented from being performed in the POS terminal 11. Since image processing such as detection of similar images takes time to process, by preventing processing of frame images that do not include products and for which there is no prospect of detecting a similar image, it is possible to shorten the processing time.

The similar image detection unit 611 detects a product image that is similar to at least a portion of a region of the image that is output from the product reading apparatus 101 using a pattern matching technique or the like by referencing the PLU file F1. The pattern matching technique uses a known similar image searching technique that is performed by comparing two images. From a detection result of the similar image detection unit 611, the POS terminal 11 is able to specify the product that is read by the product reading apparatus 101 out of the products that are registered in advance in the PLU file F1.

The product registration unit 612 performs sales registration by recording, on a sales master file or the like, information relating to the sales registration that is related to the product image that is detected by the similar image detection unit 611, that is, the product ID, the product category, the product name, the unit price, and the like of the product that is specified as the product that is read by the product reading apparatus 101.

Figure 5:
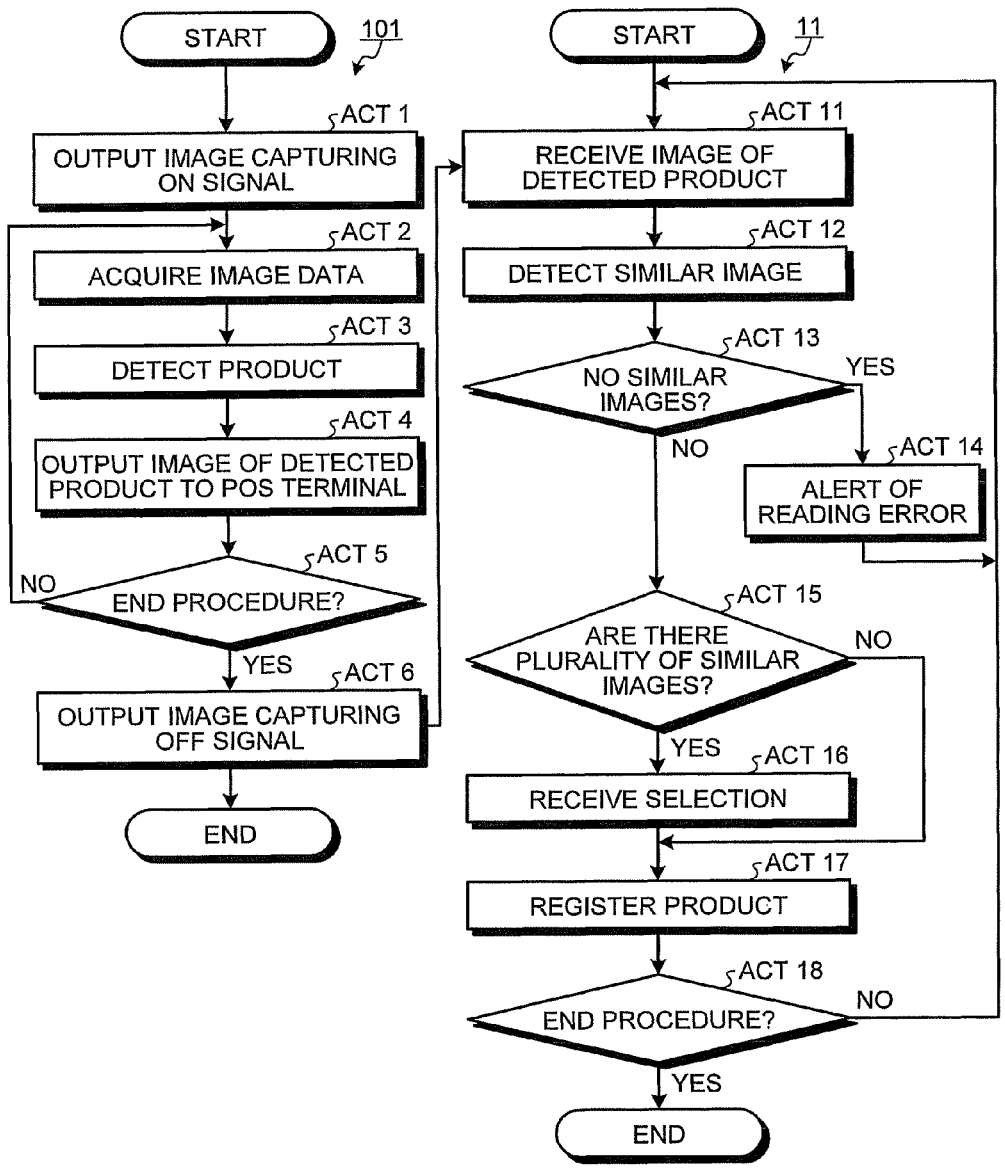
FIG. 5 illustrates a flowchart of one example of an action of a checkout system according to the embodiment.

Next, actions of the checkout system 1 will be described in detail. FIG. 5 illustrates a flowchart that is one example of the actions of the checkout system 1 according to the embodiment.

First, the actions of the product reading apparatus 101 side will be described. As illustrated in FIG. 5, when processing is started according to the start of product registration by the POS terminal 11, the captured image acquiring unit 1611 outputs an image capturing ON signal to the image capturing unit 164 and starts the image capturing by the image capturing unit 164 (Act 1). Next, the captured image acquiring unit 1611 acquires frame images (captured images) that the image capturing unit 164 captures and which are saved in the RAM 163 (Act 2). Next, the product detection unit 1612 performs detection of a product from the frame images that the captured image acquiring unit 1611 acquires (Act 3). Next, the image output unit 1613 outputs the frame images in which products are detected by the product detection unit 1612 to the POS terminal 11 (Act 4).

Figures 6, 7:
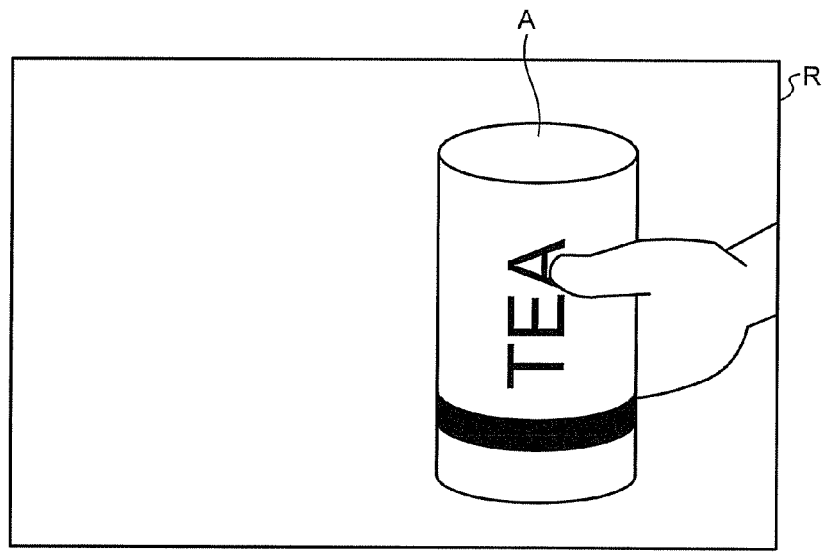
FIG. 6 illustrates a conceptual diagram of an example of a reading region in a reading window.
FIG. 7 illustrates a conceptual diagram of one example of registration data that is registered on the PLU file.

FIG. 6 illustrates a conceptual diagram that is an example of a reading region R of the reading window 103. Specifically, FIG. 6 is a conceptual diagram that exemplifies the reading region R when the product A is read. As illustrated in FIG. 6, when the product A appears in the reading region R during a movement process of the product A described above, the product A is detected from a frame image that is captured of the reading region R by Act 3. By the detection of the product A, the frame image that is captured of the reading region R is output to the POS terminal 11 in Act 4.

Next, the CPU 161 determines whether the procedure is ended by an ending notification of product registration or the like from the POS terminal 11 (Act 5). When the procedure is to be continued (Act 5: NO), the CPU 161 continues the process by returning the process to Act 2. When the procedure is to be ended (Act 5: YES), the captured image acquiring unit 1611 outputs an image capturing OFF signal to the image capturing unit 164 and ends the image capturing by the image capturing unit 164 (Act 6), and the process is ended.

Next, the actions of the POS terminal 11 side will be described. As illustrated in FIG. 5, if processing is started according to the start of product registration or the like by an operating instruction by the keyboard 22, the CPU 61 receives the frame image in which the product is detected which is input from the product reading apparatus 101 (Act 11). Next, the similar image detection unit 611 detects a product image that is similar to at least a portion of a region of the frame image that is output from the product reading apparatus 101 by referencing the PLU file F1 (Act 12), and the presence or absence of the product image that is detected as being similar is determined (Act 13).

When there are no product images that are detected as being similar (Act 13: NO), the CPU 61 alerts of a reading error to the store clerk such as that registration relating to the product that is read by the product reading apparatus 101 is not performed (Act 14), and the process is returned to Act 11. Specifically, the store clerk is alerted of an error by a screen display on the display device 23 or the display device 106 via the connection interfaces 65 and 176, an output of a warning sound by the sound output unit 165 via the connection interfaces 65 and 175, or the like. By performing such an alert, the checkout system 1 is able to prompt the store clerk to perform an appropriate operation such as to have the product A reread.

When there is the product image that is detected as being similar (Act 13: YES), the CPU 61 determines whether there is a plurality of such detected product images (Act 15). When there is only one detected product image (Act 15: NO), the CPU 61 proceeds the process to Act 17 from the fact that the product is specified by the reading by the product reading apparatus 101. When there is a plurality of detected product images (Act 15: YES), the CPU 61 displays a selection screen on the display device 106 due to the fact that the detection of the product images that are similar did not specify one product, receives a selection of one product by the store clerk by receiving an operation of the touch panel 105 (Act 16), and the proceeds the process to Act 17.

FIG. 7 illustrates a conceptual diagram that is one example of registration data D1 and registration data D2 that are registered on the PLU file F1. When the product A exemplified in FIG. 6 is read, a plurality of product images is detected as product images that are similar, as in the registration data D1 and D2 of FIG. 7. In such a case, it is also possible to narrow down the registration data to the registration data D1 by setting a threshold value when determining the degree of similarity to be high. However, there is also a case when, by raising the threshold value when determining the degree of similarity, similar images are conversely not detected at all, and there is the increased effort of having the product A reread. Therefore, in the embodiment, when a plurality of similar product images is detected, the effort of having the product A reread is eliminated by having the store clerk select a product from among the plurality of product images.

Figure 8:
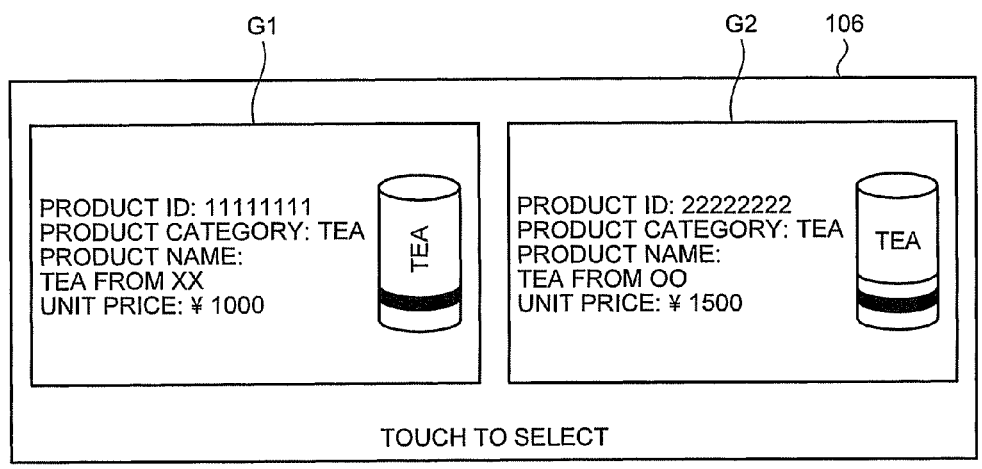
FIG. 8 illustrates a conceptual diagram of a display example of a display device.

FIG. 8 illustrates a conceptual diagram of a display example of the display device 106. Specifically, FIG. 8 is a conceptual diagram that exemplifies a selection screen of the display device 106 when a selection of one product from the store clerk is received. As illustrated in FIG. 8, in Act 16, product information related to the plurality of detected product images is read from the PLU file F1 and images G1 and G2 of products to be selected are displayed on the display device 106. In the example shown, the image G1 that selects the product of the registration data D1 and the image G2 that selects the product of the registration data D2 of FIG. 7 are displayed. The store clerk selects the image G1 or the image G2 by touching the touch panel 105.

In Act 17, the product registration unit 612 registers a detection result of a similar product image or the sale of one product that is selected and specified from the detection result. Next, the CPU 61 determines whether the procedure is ended by the ending of product registration by an operating instruction of the keyboard 22, or the like (Act 18). When the procedure is to be continued (Act 18: NO), the CPU 61 continues the process by returning the process to Act 11. When the procedure is to be ended (Act 18: YES), the CPU 61 ends the process.

As described above, in the checkout system 1, the product reading apparatus 101 acquires a captured image and outputs the acquired image to the POS terminal 11. The POS terminal 11 detects an image of a product that is similar to at least a portion of a region of the output image by referencing the PLU file F1 in which information relating to sales registration of a product and an image of the product are associated for each product, and registers the sale of the product based on information relating to the sales registration that is related to the detected image of the product. Therefore, the checkout system 1 is able to perform product registration without the need for the store clerk to make the effort of checking a location of a code symbol that is attached to the product A, or the like.

A program that is executed by the POS terminal 11 and the product reading apparatus 101 in the embodiment is provided by being built into a ROM or the like in advance. The program that is executed by the POS terminal 11 and the product reading apparatus 101 of the embodiment may have a configuration of being provided by being recorded on a computer readable recording medium such as a CD-ROM, a flexible disk (FD), a CD-R, a DVD (Digital Versatile Disc), or the like in a file of an installable format or an executable format.

In addition, the program that is executed by the POS terminal 11 and the product reading apparatus 101 of the embodiment may have a configuration of being provided by being stored on a computer that is connected to a network such as the Internet and being caused to be downloaded through the network. Further, the program that is executed by the POS terminal 11 and the product reading apparatus 101 of the embodiment may have a configuration of being provided or distributed through a network such as the Internet.

The program that is executed by the POS terminal 11 and the product reading apparatus 101 of the embodiment has a module configuration including each of the parts described above (the similar image detection unit 611, the product registration unit 612, the captured image acquiring unit 1611, the product detection unit 1612, and the image output unit 1613), and as actual hardware, each of the above parts is loaded on a main memory apparatus by a CPU (processor) reading the program from the above ROM and executing the program, and the similar image detection unit 611, the product registration unit 612, the captured image acquiring unit 1611, the product detection unit 1612, and the image output unit 1613 are generated on the main memory apparatus.

Further advantages and modifications of the invention may be derived readily by those skilled in the art. Accordingly, broader embodiments of the present invention are not limited by the details and the typical embodiments represented and described above. Thus, various modifications can be made without departing from the spirit or scope of the general concept of the present invention as defined in the appended claims and their equivalents.

What is claimed is:

1. A store system comprising:
    a reading apparatus comprising an image acquiring circuit that acquires a plurality of images sequentially captured by an image capturing circuit and a product detection circuit that compares outlines extracted from the plurality of images and detects a first image of a product in an acquired image, of the plurality of images, based on detection of an image portion in which there is a change between the outlines, and an image output circuit that outputs the acquired image in response to detection of the first image of the product by the product detection circuit;

a similar image detection circuit that detects a second image of a product that is similar to at least a portion of the acquired image which is output from the reading apparatus by referencing product management information in which information relating to sales registration of respective products and images of the respective products are associated with the respective products; and a sales registration apparatus that comprises a selection circuit that prompts for a selection instruction input in response to the similar image circuit detecting multiple images of products in respective multiple images ot the plurality ot images, a sales registration circuit that registers a sale of the product based on information relating to the sales registration for a product selected based on the selection instruction input, and an alerting circuit that alerts of an error in response to a determination that an image of a product that is similar to at least a portion of the acquired image is not detected by the similar image detection circuit.

2. The system according to claim 1,
wherein the product detection circuit performs detection of the first image of the product by detecting an image of a hand that holds the product included in the acquired image.

3. The system according to claim 1,
wherein
the sales registration circuit registers sales of the product based on information relating to the sales registration of a product selected according to the selection instruction input.

4. A reading apparatus comprising:

an image acquiring circuit that acquires a plurality of images sequentially captured by an image capturing circuit;

a product detection circuit that compares respective outlines extracted from the plurality of images and detects first image of a product within an acquired image, of the plurality of images, based on detection of an image portion in which there is a change between the respective outlines; and an image output circuit that outputs the acquired image in response to detection of the first image of the product by the product detection circuit.

5. The apparatus according to claim 4, further comprising:

a similar image detection circuit that detects a second image of a product that is similar to at least a portion of the acquired image which is output from the reading apparatus by referencing product management information in which information relating to sales registration of respective products and images of the respective products are associated with the respective product.

6. The apparatus according to claim 4,
wherein the product detection circuit performs detection of the first image of the product based on detection of an image of a hand that holds the product within the acquired image.

* * * * *